United States Patent
Archer

(10) Patent No.: US 9,888,539 B2
(45) Date of Patent: Feb. 6, 2018

(54) LIGHTING SYSTEM USING SENSORS

(71) Applicant: Telelumen, LLC, Saratoga, CA (US)

(72) Inventor: Ross D. Archer, San Jose, CA (US)

(73) Assignee: Telelumen, LLC, Saratoga, CA (US)

( * ) Notice: Subject to any disclaimer, the term of this patent is extended or adjusted under 35 U.S.C. 154(b) by 0 days.

(21) Appl. No.: 15/151,399

(22) Filed: May 10, 2016

(65) Prior Publication Data

US 2016/0255695 A1    Sep. 1, 2016

Related U.S. Application Data

(60) Division of application No. 14/555,381, filed on Nov. 26, 2014, now Pat. No. 9,345,117, which is a continuation of application No. 13/046,578, filed on Mar. 11, 2011, now Pat. No. 8,922,570.

(51) Int. Cl.
H05B 37/02 (2006.01)
H05B 33/08 (2006.01)

(52) U.S. Cl.
CPC ..... H05B 33/0845 (2013.01); H05B 33/0884 (2013.01); H05B 37/029 (2013.01); H05B 37/0218 (2013.01); H05B 37/0236 (2013.01); H05B 37/0245 (2013.01); H05B 37/0254 (2013.01); H05B 37/0272 (2013.01); H05B 37/0281 (2013.01)

(58) Field of Classification Search
CPC .......... H05B 37/0245; H05B 37/0254; H05B 37/0272; G06F 3/038
USPC ............. 315/291, 294, 307, 308, 312, 360; 345/204, 530, 690
See application file for complete search history.

(56) References Cited

U.S. PATENT DOCUMENTS

| 6,525,855 B1 | 2/2003 | Westbrook et al. |
| 6,683,423 B2 | 1/2004 | Cunningham |
| 6,890,085 B2 | 5/2005 | Hacker |
| 6,965,205 B2 | 11/2005 | Piepgras et al. |

(Continued)

FOREIGN PATENT DOCUMENTS

| EP | 1750428 A2 | 7/2007 |
| EP | 1876385 A2 | 9/2008 |

(Continued)

OTHER PUBLICATIONS

Won, Euntae, Samsung Electronics "SG VLC Project Draft 5C" IEEEP802.15 15-08-0667-01-0vlc, Sep. 2008, pp. 1-3.

(Continued)

*Primary Examiner* — Tung X Le
(74) *Attorney, Agent, or Firm* — David T. Millers

(57) ABSTRACT

A luminaire produces lighting as a series of frames of constant spectral content includes sensors and an interpreter for executing scripts that describe the spectral contents of respective frames. The scripts may include spectral data and executable code for altering the spectral data and depend on sensor data. In particular, a frame descriptor may include data for a frame, a repeat count indicating a number of frames, and an identifier for a subroutine that uses sensor data. One or more luminaires can be network connected to one or more computers running applications providing user interfaces for script generation. A standardized interface can control communications with the luminaires and convey sensor data.

13 Claims, 5 Drawing Sheets

(56) References Cited

U.S. PATENT DOCUMENTS

| | | |
|---|---|---|
| 7,023,543 B2 | 4/2006 | Cunningham |
| 7,046,160 B2 | 10/2006 | Baldwin et al. |
| 7,119,498 B2 | 10/2006 | Baldwin et al. |
| 7,125,143 B2 | 10/2006 | Hacker |
| 7,178,941 B2 | 2/2007 | Roberge et al. |
| 7,202,613 B2 | 4/2007 | Morgan et al. |
| 7,221,104 B2 | 5/2007 | Lys et al. |
| 7,227,634 B2 | 6/2007 | Cunningham |
| 7,626,345 B2 * | 12/2009 | Young ............... H05B 33/0866 315/291 |
| 7,688,280 B2 | 3/2010 | Callegari et al. |
| 7,710,369 B2 | 5/2010 | Dowling |
| 8,937,444 B2 * | 1/2015 | Ogg ................... H05B 37/029 315/292 |
| 2003/0057884 A1 | 3/2003 | Dowling et al. |
| 2003/0107887 A1 | 6/2003 | Eberl |
| 2004/0105261 A1 | 6/2004 | Ducharme et al. |
| 2004/0218387 A1 | 11/2004 | Gerlach |
| 2005/0046850 A1 | 3/2005 | Chow |
| 2006/0006820 A1 | 1/2006 | Roseman et al. |
| 2006/0132800 A1 | 6/2006 | Yoshida |
| 2006/0176693 A1 | 8/2006 | Walter et al. |
| 2007/0174773 A1 | 7/2007 | Abernathy, Jr. et al. |
| 2008/0225520 A1 | 9/2008 | Garbus |
| 2008/0265799 A1 * | 10/2008 | Sibert ............... H05B 37/0245 315/292 |
| 2009/0309513 A1 | 12/2009 | Bergman et al. |
| 2009/0323321 A1 * | 12/2009 | Paolini ................ H05B 33/086 362/231 |
| 2010/0251157 A1 | 9/2010 | Wendt et al. |
| 2011/0235325 A1 | 9/2011 | Ramer et al. |

FOREIGN PATENT DOCUMENTS

| | | |
|---|---|---|
| GB | 2409287 A | 6/2005 |
| WO | WO0106316 A1 | 1/2001 |

OTHER PUBLICATIONS

Paolini, Steve, "Solid State Luminaires and Illumination Content", Strategies in Light Conference, 11th Annual Conference, Santa Clara, California, pp. 1-20 (Feb. 10-12, 2010).

Paolini, Steve, "Exploiting the Visible Spectrum Progress and Future" Strategies in Light Conference, 11th Annual Conference, Santa Clara, California, pp. 1-18 (Feb. 10-12, 2010).

Paolini, Steven, "Solid state lighting in buildings:status and future", Tenth Annual Conference on Solid State Lighting, San Diego, California, SPIE Proceedings, vol. 7784, 77840K, pp. 1-10 (Aug. 18, 2010).

Paolini, Steve, "Solid-State Lighting—Demystifying the Pieces and Assembling the Future", Strategies in Light Conference, 12th Annual Conference, Santa Clara, California, pp. 1-39 (Feb. 22-24, 2011).

* cited by examiner

PROPELLER SYSTEM
900

| FLOATING POINT STACK 910 |
|---|
| T (64BITS) |
| Z (64BITS) |
| Y (64BITS) |
| X (64BITS) |

| CHANNEL REGISTERS 920 | |
|---|---|
| PWM 00 | AM 00 |
| PWM 01 | AM 01 |
| ⋮ | ⋮ |
| PWM 31 | AM 31 |

| FRAME REGISTERS 930 |
|---|
| R (32 BITS) |
| I (32 BITS) |
| C (5 BITS) |

| CONTROL REGISTERS 940 |
|---|
| PC (16 BITS) |
| IR (72 BITS) |
| SP (16 BITS) |

| PROGRAM STACK 960 |
|---|
| RETURN 1 |
| ⋮ |
| RETURN X |

| MEMORY FILE 950 |
|---|
| MEM 00 (64BITS) |
| MEM 01 (64BITS) |
| ⋮ |
| MEM 99 (64BITS) |

DETERMINE DESIRED SPECTRAL POWER DISTRIBUTIONS SPD(0), SPD(1), ... SPD(M-1) FOR A SERIES OF TIMES — 1010

FOR EACH SPD DETERMINE CHANNEL DATA, e.g, K PAIRS OF DRIVE PARAMETERS (PWM,AM) — 1020

PRODUCE LUMENSCRIPT — 1030

COMPILE LUMENBSCRIPT TO PRODUCE COMPILED LUMENSCRIPT — 1040

INTERPRET COMPILED LUMENSCRIPT TO PRODUCE LIGHTING — 1050

*FIG. 10*

LIGHTING SYSTEM USING SENSORS

CROSS-REFERENCE TO RELATED APPLICATIONS

This patent document is a divisional and claims benefit of the earlier filing date of U.S. patent application Ser. No. 14/555,381, filed Nov. 26, 2014, now U.S. Pat. No. 9,345,117, which claims benefit of the earlier filing date of U.S. patent application Ser. No. 13/046,578, filed Mar. 11, 2011, now U.S. Pat. No. 8,922,570, both of which are hereby incorporated by reference in their entirety.

BACKGROUND

Lighting systems for research, entertainment, commercial, and residential use are desired that can control the time variation of the spectrum and spatial distribution of light in an illuminated environment. U.S. Pat. App. Pub. No. US 2009/0323321 A1, entitled "Authoring, Recording, and Replication of Lighting," which is hereby incorporated by reference, describes some examples of the use of lighting systems including one or more luminaires where each luminaire is capable of producing light with an adjustable spectral distribution. In one configuration, a luminaire contains multiple types of light sources, e.g., multiple types of light emitting diodes, with each type producing a different spectral distribution, and the relative intensities of the different types of light sources in the luminaire are adjustable to control the spectrum of the combined output from the luminaire. U.S. Pat. App. Pub. No. US 2009/0323321 A1 further describes that the combined output spectrum from a lighting system can mimic recorded or authored lighting scenarios that may include time or spatial variations in the spectrum or intensity of lighting. To provide complex lighting scenarios, luminaire systems and control methods are desired that enable a luminaire to reproduce a desired time variation in intensity or spectrum of lighting output from that luminaire and that enable multiple luminaires to operate in a coordinated fashion to control time or spatial variations in the intensity and spectrum in an illuminated environment.

SUMMARY

In accordance with an aspect of the invention, a lighting apparatus or luminaire has multiple light channels that produce different spectral distributions of light. A drive circuit in the luminaire is coupled to the light channels and is programmable to control relative intensities of the light output from the light channels. The lighting apparatus also includes an interpreter module that processes scripts to generate operating parameters for the drive circuit. In particular, when processing a script, the interpreter generates the operating parameters that cause the light channels to collectively reproduce a lighting scenario represented by the script.

In accordance with another aspect of the invention, a lighting apparatus or luminaire includes multiple light channels, a drive circuit, a processor, and a timing circuit. The light channels operate to produce different spectral distributions of light, and the drive circuit is coupled to the light channels and is programmable to control relative intensities of light output from the light channels. The timing circuit provides the processor with a frame clock signal and a channel clock signal. The processor then outputs a partial set of parameters for programming of the drive circuit (e.g., parameters for one light channel) in synchronization with the channel clock signal and provides a complete set of the parameters for programming the drive circuit in synchronization with the frame clock signal. A frame rate as high as 1000 Hz or higher can be achieved to reproduce rapid lighting effects such as flashes or lighting strikes, while still allowing reproduction of lighting scenarios that may evolve over time periods of a day or more.

In accordance with yet another aspect of the invention, a lighting system includes one or more luminaires that are connected through a network to a computing system. Some or all of the luminaires may be capable of producing lighting having a programmable spectral distribution. The computing system, which may include one or more computers, can execute one or more applications that are adapted for operation of the luminaires and an application interface that intervenes between the applications and the luminaires. In particular, the interface may implement a standard for operation of luminaires that can differ in physical capability, receive and forward commands for the luminaires, or process descriptions or scripts of lighting scenarios from the applications and generate scripts that are executable by the specific luminaires in the system. For example, processing of a description can convert or compile the description from an application into a format that at least one of the luminaires can interpret to produce lighting according to the lighting scenario represented by the description processed.

In accordance with still another aspect of the invention, a media can contain a descriptor adapted for a luminaire to process in order to produce lighting represented by the descriptor. In one specific embodiment, the descriptor includes data representing a spectral distribution for lighting, a time parameter indicating a duration of the lighting represented by the descriptor; and a call parameter identifying a procedure for the luminaire to execute during the duration of the lighting represented by the descriptor. Typically, execution of the procedure alters the lighting produced by the luminaire. The media may further contain multiple descriptors of this type and instruction code that the luminaire can execute to produce lighting.

BRIEF DESCRIPTION OF THE DRAWINGS

FIG. 9 is a block diagram illustrating an architecture of a co-processor for a luminaire in accordance with an embodiment of the invention.

FIG. 10 is a flow diagram of a process for producing a desired lighting scenario and illustrates processes where device-independent data corresponding to the lighting scenario can be transformed to device-dependent data.

Use of the same reference symbols in different figures indicates similar or identical items.

DETAILED DESCRIPTION

In accordance with an aspect of the invention, a lighting system can include a luminaire or light fixture including multiple light channels with different emission spectra and a processor able to interpret a script representing a lighting scenario and produce operating parameters that cause the light channels to collectively reproduce the lighting scenario that the script represents. Representations of the scripts include user-editable script that may be authored using a scripting language, custom software tools that support script development, or even an integrated development environment (IDE) and compiled scripts that can be uploaded into the luminaire. The lighting scripts can be device-independent and portable for use in different luminaires. Some embodiments of the lighting system can further include one or more application computers on which scripts can be authored and compiled, an application program interface providing services to the applications, and a network through which the applications computers can communicate with one or more luminaires and with each other.

Figure 1:
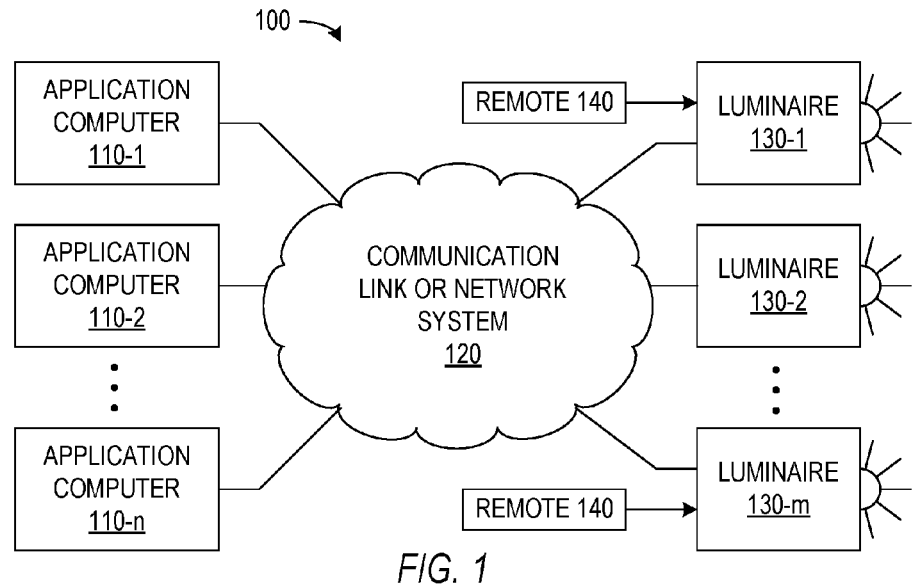
FIG. 1 shows a top level schematic view of a lighting system in accordance with an embodiment of the invention in which one or more luminaires are connected to a network and one or more application computers.

FIG. 1 shows a lighting system 100 in accordance with an embodiment of the invention including one or more application computers 110-1 to 110-$n$, a communication link or links represented by a network 120, and one or more luminaires 130-1 to 130-$m$. Application computers 110-1 to 110-$n$ are sometimes generically referred to herein as application computers 110, and luminaires 130-1 to 130-$m$ are sometimes generically referred to herein as luminaires 130. In general, the number n of application computers 110 may be the same or different from the number m of luminaires. For example, a single application computer 110 may be used to operate multiple luminaires 130, but in general numbers n and m can be any positive integers. The presence of multiple application computers 110 can allow control of luminaires 130 from multiple locations. The presence of multiple luminaires 130 facilitates creation of spatial variation in lighting and combined lighting effects that may be difficult or impossible to achieve using a single luminaire.

Each application computer 110 runs software, firmware, or hardwired applications that enable users to control luminaires 130. Each application computer 110 may be a computing device such as a general-purpose or custom-made dedicated computer, a smart phone, or a device such as a remote control specifically constructed or designed for control of luminaires 130. An application computer 110 may additionally be equipped with or attached to specialized hardware such as spectral sensors or recorders that measure light in an environment, light produced by one or more luminaires 130, light reflected from an object illuminated by one or more luminaires 130, or light from another light source. Some examples of applications that may be run by an application computer 110 include a graphical interface that enables a user to design or record a lighting scenario and a programming environment for development of scripts for lighting scenarios. Each application computer 110 may also communicate with any or all luminaires 130 through an application interface as described further below.

Communication system 120 transports messages between application computers 110 and luminaires 130. Communication system 120 can employ any desired communications technique such as defined by the well known Ethernet wired communication standards or Wi-Fi and Bluetooth wireless communication standards for local area networks and may further employ wide area network communications such as provided through the Internet. More generally, any communication system that can transport information between any application computer 110 and any luminaire 130 in system 100 could be employed. For example, a network for communication system 120 may be implemented using any topology, including point-to-point, bus, star, or ring topologies, and communication links for system 120 may be implemented using copper, wireless, optical, RF, or another physical-layer technology.

System 100 shows remote controls 140 that send commands to luminaires 130. Remote controls 140 can either communicate using communication system 120 or using direct links that are separate or of types different from the communication links used by application computers 110. For example, in one embodiment, a remote control 140 can be a simple application computer that is able to control functions of a luminaire 130 such as whether the luminaire is on or off, the maximum intensity of light from the luminaire, or activation of presets or lighting scripts previously stored in the luminaire. In an exemplary embodiment, remote control 140 is a conventional infra-red remote control that communicates with and controls luminaires 130 using a free-space optical link, as is commonly employed for current home entertainment equipment.

Each luminaire 130 receives commands over communication system 120 or otherwise, executes the commands, and may communicate success or failure for each operation over communication system 120, e.g., back to an application computer 110 that issued the command. In accordance with one embodiment of the invention, each luminaire 130 contains logic or a processor with suitable processing power to convert a script that defines a light scenario into actual light output from the luminaire 130. In a lighting system containing multiple luminaires 130, the luminaires 130 may all be substantially the same except for their positions or orientations in a lighting environment, or luminaires 130 may differ from each other in features such as size, maximum intensity, and the number and type of light sources within the different luminaires 130. In particular, one or more luminaires 130 may not provide an adjustable spectral output.

At any given time, each application computer 110 in a lighting system 100 can run zero, one, or more luminaire applications, and each luminaire application can control any number of luminaires 130. The luminaire applications can present a user with some depiction of the light network and its status and may allow the user to change the state of the lighting system, e.g., through a graphical user interface. As described further below, an application may generate scripts or may simply send commands to luminaires 130, and may permit the user to visualize the current state of the lighting system according to different relevant critiera. In accordance with an aspect of the invention, each of the applications computers 110 further includes an application interface that provides a standard software interface between the applications and the luminaires 130 and also provides system-wide traffic control. The traffic control can be used to prevent multiple applications from sending luminaires 130 commands that are conflicting, inconsistent, not in a required order, or in a sequence resulting in an ambiguous final luminaire state.

Figure 2:
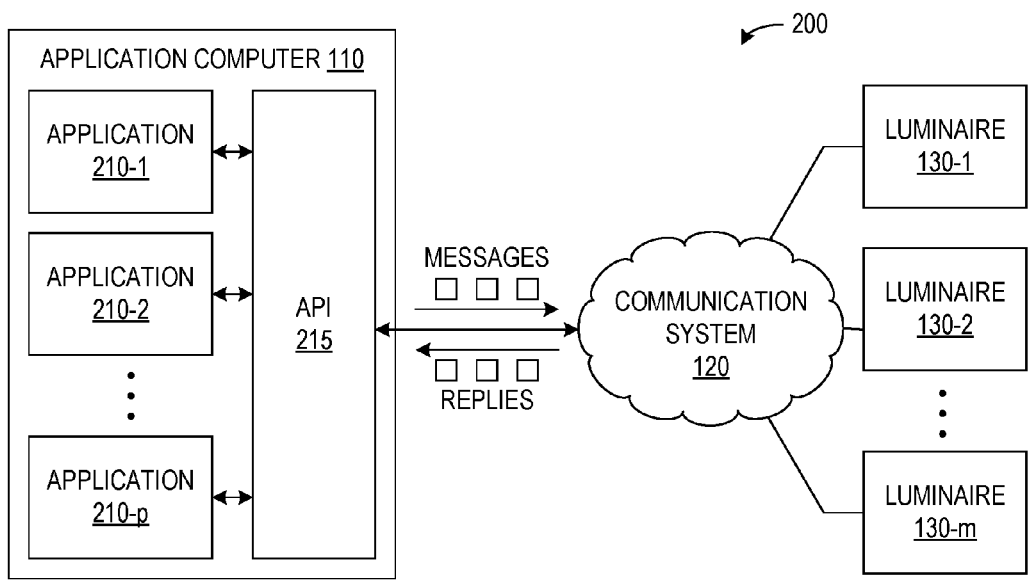
FIG. 2 shows a schematic view of a lighting system in accordance with an embodiment of the invention in which a computer employs an application interface enabling one or more applications to operate one or more luminaires.

FIG. 2 illustrates a relatively simple example of a lighting system 200 that includes a single application computer 110 running p applications 210-1 to 210-$p$ that may communicate with luminaires 130. As noted above, an application program interface (API) 215 can provide a standardized interface to applications 210-1 to 210-$p$, so that applications 210-1 to 210-$p$ communicate with luminaires 130 only through API 215. API 215 can adapt or be adapted to the specific configurations of communication system 120 and luminaires 130 so that applications 210 do not required detailed information regarding luminaires 130. In particular, the number m and the types of luminaire(s) 130 may be different in different embodiments of lighting system 200, and API 215 may be configured to send messages to and receive replies from the particular luminaires 130 in the particular lighting system 200.

Figure 3:
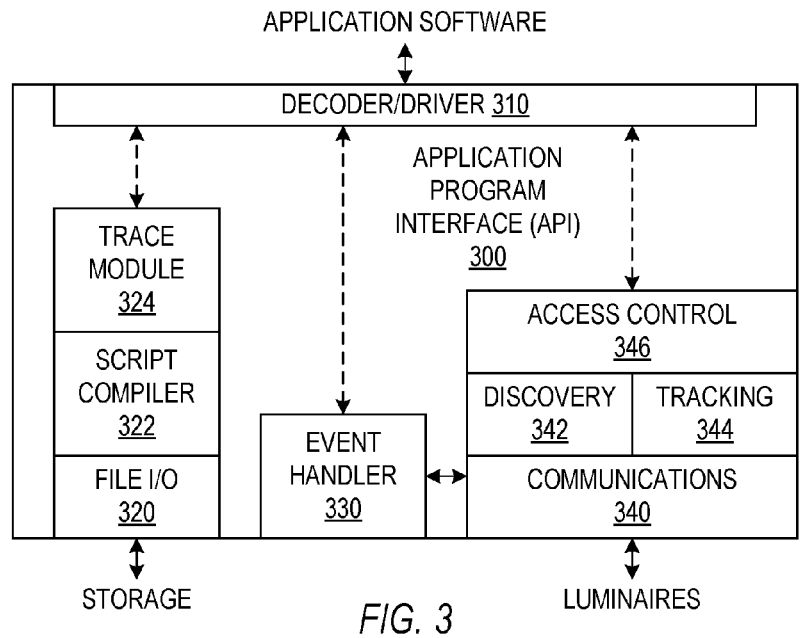
FIG. 3 is a block diagram illustrating functional units of an application interface used in controlling luminaires in one embodiment of the invention.

FIG. 3 shows a block diagram of an API 300 that provides an interface between applications and luminaires. On the application side, API 300 presents a set of function calls to accomplish light control operations, such as turning a luminaire on or off, dimming intensity, uploading or playing of scripts, or applying user-defined mathematical transforms to light data to vary lighting. API 300 also allows application software to read a sensor on a luminaire to determine operational characteristics such as temperature, voltage, current consumption, light levels, spectral power distribution, sound pressure level, and other operating parameters of the luminaire if a suitable sensor is accessible in the luminaire.

API 300 including its component modules 310, 320, 330, and 340 will be generally implemented or executed in a computing device such as an application computer described above. API 300 can also be embodied in a computer-readable media, e.g., a non-transient media such as an optical or magnetic disk or a memory card, containing instructions that a computing device can execute to perform specific processes that are further described herein. Such media embodying API 300 may further be a server or other device connected to a network such as the Internet that provides for the downloading of data and computer executable instructions.

A decoder/driver module 310 in API 300 acts as the "control logic" for driving the internal operation of other internal components, e.g., a File I/O component 320, an event handler module 330, and a communications module 340 of API 300. Decoder module 310 in particular interprets and controls the function call or calls from applications and activates the other modules to produce the action defined for each function call.

File I/O module 320 provides support for reading and writing files to and from storage that may be available in or connected to the application computer. File I/O module 320 is also involved in transferring files to and from a luminaire's file system via communications module 340.

A script compiler 322 uses file I/O module 320 to read high-level script source files that the application software produces and then encodes or compiles the source files in a format suitable for use in the available luminaire(s). The source files can be constructed using a standardized syntax or programming language and are sometimes referred to herein as scripts. The scripts may be independent of the particular implementation of the available luminaire(s) in a lighting system, so that the scripts are usable in different lighting systems which may have different numbers, types, and arrangements of luminaires. The compiled script files will be in formats that can be efficiently handled or run in specific luminaires and may differ for different luminaires and particularly may depend on luminaire hardware. Alternatively, the compiled scripts may be independent of luminaire hardware and interpreted differently in different luminaires to produce or approximate the lighting scenario represented by the script. A compiled script output from script compiler 322 can be distinguished using a file type or file types that differ from the file type used for source scripts. The complied scripts can be written back to storage in the application computer or sent through communication module 340 to one or more target luminaires or to a network accessible storage device.

Script compiler 322 can detect and report syntax errors in a script when the script is compiled. However, API 300 in the embodiment of FIG. 3 also includes a trace module 324 that provides the ability to troubleshoot unexpected failures when running scripts in luminaires. Trace module 324 reports an error condition if a script encounters an error condition when running. For example, trace module 324 may report a communication failed when a luminaire is off or unplugged unexpectedly. Trace module 324 may also keep track of system state details to help a user identify the probable reason for the failure to help troubleshoot a problem.

Communications module 340 supports communication links between API 300 and the available luminaires, e.g., luminaires 130 of FIG. 1 or 2. In the specific implementation of FIG. 3, a discovery module 342 is associated with communication module 340 and operates to search for and find luminaires in a lighting system, e.g., connected to API 300 through the links supported by communication module 340. Discovery module 342 can particularly provide a unique address for each luminaire to allow for unambiguous identification of each luminaire. Discovery module 342 can further communicate with the available luminaires to determine the types, locations, or abilities of the luminaires. Information concerning the types of luminaires may be necessary for script compiler 322 to create compiled files for uses in the luminaires. An associated tracking module 344 looks for changes in a lighting system, such as when a luminaire is switched off or removed, or when a new luminaire is added or switched on, and keeps these changes current for discovery module 342.

Access control module 346, which may communicate with an external database, keeps track of users or application software to control which user or application has use of each luminaire at any given time. In particular, access control module 346 acts to prevent conflicts between multiple applications or application computers that might otherwise try to control the same luminaire unit at the same time.

Event handler 330 serves to receive sensor data and messages from the luminaires indicating trouble or exceptional conditions of importance, such as abnormally high temperature or luminaire "disk full" conditions. These events can be communicated back to the applications to alert a user of trouble.

Figure 4:
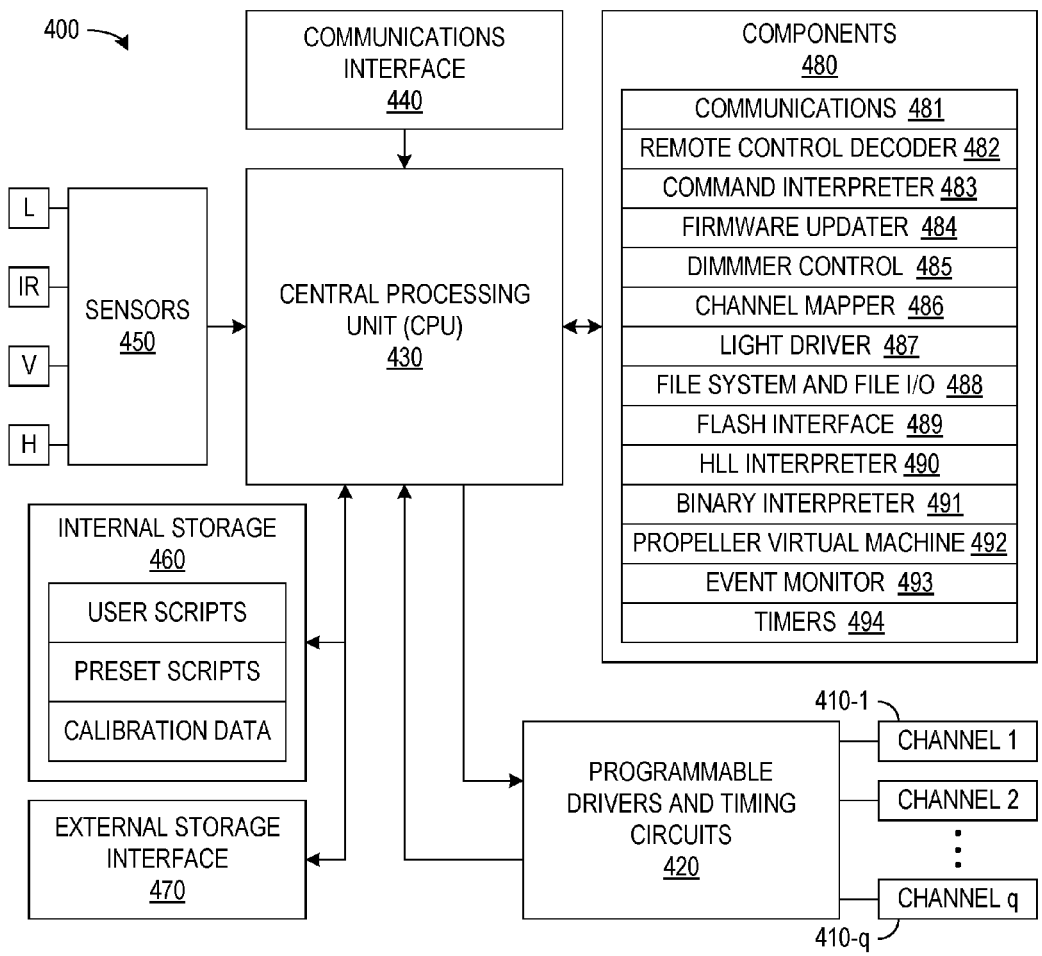
FIG. 4 is a block diagram of a luminaire in accordance with an embodiment of the invention.

FIG. 4 shows an embodiment of a luminaire 400 in accordance with an embodiment of the invention. Luminaire 400 includes q different types of light channels 410-1 to 410-$q$ (sometimes generically referred to herein as light channels 410) and associated driver circuits 420 that are programmable to independently control the respective intensities of light output from light channels 410-1 to 410-$q$. In an exemplary embodiment, each light channel 410 includes one or more light emitting diodes (LEDs), where the number of light emitting diodes in a particular light channel 410 may be selected according to the required range of intensity output from that light channel 410. Light channels 410 are generally different in construction to provide different frequencies of light output. For example, light channel 410-1 may contain one or more LEDs emitting light with a spectrum peaked at wavelength of about 393 nm (purple), 423 nm (violet), 438 nm (violet-blue), 462 nm (blue), 482 nm (blue), 496 nm (turquoise), 511 nm (green), 521 nm (green), 540 nm (yellow-green), 577 nm (yellow), 587 nm (orange), 593 nm (orange-red), 629 nm (red), 655 nm (deep red), 694 nm (deeper red), or 733 nm (very deep red). One specific embodiment of luminaire 400 has eight or sixteen light channels 410 selected according to a desired spectral range and resolution of luminaire 400. More generally, a luminaire may have as few as a single light channel (if spectral variation is not required) or as many light channels as desired. In one embodiment, the number of light channels may be limited to a maximum of thirty-two in order to provide the possibility for relatively fine resolution control of spectral content of lighting while also providing reasonable sizes for instructions and data structures for source scripts and compiled scripts.

A central processing unit 430, which may include at least one microcontroller or microprocessor such as an ARM processor, controls driver circuits 420 to control the light output from luminaire 400. In particular, CPU 430 can change operating parameters of programmable driver circuits 420 to set, at intervals, the magnitude, frequency, or duty cycle of drive signals respectively applied to light channels 410. Changing the drive parameters (e.g., the magnitude and the duty cycle of an analog drive signal) can change light output from light channels 410. The number q of light channels and the interval between updates of drive parameters for light channels 410 may depend on the particular luminaire 400 or on user configuration of luminaire 400. However, the interval between light changes in lighting will typically be selected according to the subject of the lighting, for example, at a frequency high enough to provide a human observer with light that appears to change smoothly. In one embodiment, lighting frames are presented at a rate of 1000 Hz, which is fast enough to reproduce high speed lighting events such as flashes or lightning strikes, although the same lighting frame may be presented repeatedly to maintain a constant light output for as long as desired. The frequency of a drive signal applied to a light channel 410 is generally one or more order of magnitude higher that the frame rate. However, variation in the frequencies of the drive signals can be used for other purposes, such as optical communication of information, while variation in the duty cycle and amplitude of the drive signals are used for change the light output in a manner detectable by human vision and perception.

CPU 430 is further attached to hardware devices including a communications interface 440, sensors 450, internal storage 460, and an interface 470 for access of external storage. Communications interface 440 provides hardware for communications with application computers or other luminaires over a network such as network 120 of FIG. 1 or 2. Communication interface 440 may, for example, include hardware suitable for connection to an Ethernet network or a Wi-Fi network.

Sensors 450 may include an infrared (IR) sensor, voltage and current sensors, a light intensity sensor, color sensors, a spectral power distribution sensor (e.g. spectrometer), a sound-pressure-level sensor, or other devices that CPU 430 may access. An IR sensor may, for example, be used to receive remote-control commands from handheld remote units. (Remote control devices may alternatively communicate with luminaire 400 through communications interface 440 and may, for example, be a simple example of an application computer.) Voltage and current sensors can evaluate power consumption in luminaire 400 and might, for example, provide input data to a script or firmware process intended to optimize energy efficiency of luminaire 400 under particular lighting conditions. A process defined by a script or a firmware component could similarly access light intensity sensors, color sensors, and spectral power distribution sensors to monitor performance of luminaire 400 and determine whether a desired lighting scenario has been achieved. Sound sensors could be employed, for example, in implementing voice or sound command of luminaire 400 or to synchronize lighting processes with sound cues. As will be understood, these examples of sensors 450 and uses of sensors 450 can vary according to the particular embodiment of luminaire 400 and the lighting scenarios to be produced.

Internal storage 460 and external storage coupled to interface 470 can store information such as script files that CPU 430 processes to control the illumination from luminaire 400. Internal storage 460 can include both volatile memory (e.g., RAM) and non-volatile memory (e.g. flash memory) that is external to CPU 430 and memory (volatile or non-volatile) that is built into CPU 430. External storage interface 470 is optional and may enable CPU 430 to access external devices such as hard drives, disk drives, and memory sticks. For both internal and external storage, luminaire 400 can employ a file system for internal storage 460 and external storage that persists until deliberately erased. Thus, scripts can remain in luminaire 400 once the scripts are loaded. Also, parameter settings can be set to take effect and remain in effect until overwritten with new values, even if power goes out. In particular, a "default" script, which executes at power-up of luminaire 400, can be stored in non-volatile internal storage 260 and be present at power up but can be changed if overwritten. Calibration data may also need to be periodically updated, but then remain fixed until changed.

Some examples of files stored in internal storage 460 might include calibration data, presets, and user files. Calibration data can be used to correlate drive signal parameters with light output and to indicate spectral characteristics of each light channel 410. Such data may be stored in non-volatile memory that is part of internal storage 460. Presets, which may also be stored in non-volatile memory, may implement a default lumen script for operation of luminaire 400 at power-up and some lighting scenarios that are believed to be of wide interest such as optimal energy efficiency for output of light for human vision, lighting that preserves human night vision, or lighting that simulates some well known light sources such as the sun, candles, or incandescent light bulbs. User files representing lighting scenarios that a user chooses for the lighting system including luminaire 400 may also be stored in non-volatile or volatile memory of internal storage 460 or of external storage. Internal storage 460 (particularly a volatile portion of internal storage 460) can also be used for program variables, temporary light output values, and many other parameters that CPU 430 uses.

The embodiment of FIG. 4 also shows program components 480, which would typically reside in non-volatile memory in CPU 430 or other internal storage 460. In an exemplary embodiment, program components 480 are firmware components that support each other and provide program logic that implements functionality of luminaire 400. FIG. 4 shows an example with some specific firmware modules or components 481 to 494 that may be included in an exemplary embodiment of luminaire 400. For example, in the illustrated embodiment, CPU 430 executes a communications module 481 to accept incoming messages from communication interface 440 and "feeds" the incoming messages to a command interpreter 482. Communication module 481 also produces outgoing messages that are transmitted through communications interface 440, for example, to convey channels status data back to an API in an application computer.

A remote control decoder 482 can be similarly employed to receive commands. For example, remote control decoder 482 may interpret signals received through sensors 450 to extract commands for luminaire 400. Although in general, commands received through decoder 482 and communications module 481 could be of the same type. Decoder 482 may be limited to some particular or simple commands such as commands to turn a luminaire on or off, to alter in a global fashion the intensity of light from luminaire 400, or to select among a set of user or preset scripts that may be stored in luminaire 400. In contrast, communications module 481 may be capable of higher data rate communications through communication interface 440 and thus be able to handle more complex messages such as downloading of new scripts for lighting or activation of programmed lighting functions.

Command interpreter 483 in general decodes each incoming message (from communication module 481 or decoder 482) to determine actions to be undertaken by luminaire 400. For example, command interpreter 483 may use a firmware updater 484 to update program components 480, use a dimmer controller 485 to change the maximum intensity of illumination from luminaire 400 in a manner separate from any script, drive individual light channels 410 to particular output levels via a channel mapper 486 and/or a light driver module 487, begin a download of a compiled script, or call a file system and file input/output (I/O) module 488.

File I/O module 488 write files to internal storage 460 or external storage accessible through interface 470 and retrieves such files for execution by CPU 430. File I/O module 488 may employ further firmware components such as a Flash interface 489 to access and control specific types of memory devices such as Flash memory. A primary use of file I/O module 488 is to write scripts to storage for future use and retrieve data and instructions from compiled scripts for real time execution in luminaire 400. If a compiled script has a file type or is otherwise determined to be a high-level language script, a high level language (HLL) interpreter 490 reads and interprets the script and feeds frame or channel data to a binary interpreter 491, which directly computes the drive parameters for each light channel 410. HLL interpreter 490 can further employ a virtual machine 492, sometimes referred to herein as propeller virtual machine (PVM) 492, which behaves as a co-processor and implements specific mathematical or high level script functions as described further below. If the compiled script is already in a low-level binary file format, then binary interpreter 491 can read and process data from the script directly without being fed data from high-level interpreter 490. In either case, binary interpreter 491 can control the light output from luminaire 400 by loading illumination or channel data into channel mapper 486 or light driver 487, which controls programmable drivers 420.

A configuration of programmable drivers 420 can be described by frame data that represents the illumination desired from luminaire 400, and event monitor 492 and firmware timers 493 can be employed to control timing for change the illumination of luminaire 400 in a manner similar to the changing of frames on a video display. In particular, timers 493 can be used for synchronization and frame output logic, to sequence and pace frame output, and to keep track of how many frames have been output since a script started.

Channel mapper 486 in the exemplary embodiment operates to map logical channel numbers, which may be specified in scripts, to the physical channels of luminaire 400. Use of channel mapper 486 in luminaires can allow luminaires that have different internal wiring or different sets of light channels 410 to run the same binary files. For example, a data structure defining a frame of illumination as described further below may contain channel data indicating the intensity of light in a set of wavelength channels, and a script compiler (e.g., script compiler 322 of FIG. 3), a high level language interpreter 490, and even binary interpreter 491 may employ a data structure that assigns channel numbers in an order of increasing wavelength. However, the physical light channels 410 actually in luminaire 400 may differ from the logical channels. For example, the physical light channels 410 may be in a different order from the logical arrangement. Channel mapper 486 can map channel data that is in a luminaire-independent logical order into channel data arranged for the available physical light channels in luminaire 410.

Light driver module 487 communicates luminaire-specific channel data to driver circuits 420. In an exemplary embodiment, some or all of light channels 410 implemented using LEDs and drivers 420 are programmable LED drivers. For LEDs, the output of each light channel 410 can be controlled using two parameters respectively controlling or modulating the pulse width and the amplitude of the drive signal for the light channel. A benefit of pulse width modulation (PWM) is that light output is approximately proportional to the duty cycle of the signal, so that making a duty cycle change causes a proportional change in light intensity. A benefit of further allowing for user-programmable amplitude modulation is an enhancement of the dynamic range of light output. In particular, light intensity resolution at the low end of the intensity range can be provided without sacrificing the high end of the intensity range. However, the dependence of light intensity from a channel on the AM parameter for the channel is typically not linear.

Non-linearities associated with current flow, temperature, and to a lesser extent PWM complicate determination of PWM and AM parameters that produce a precise level of light from a light channel 410. In luminaire 400, the performance of each light channel 410 can be measured or characterized at a variety of different current levels and duty cycles, and such measurements or characterizations can be stored in internal storage 460 as calibration data. Light driver module 487 can use linear or other interpolation over the relatively small ranges between values of the calibration data to derive the correct drive parameters for each light channel 410. This calibration mechanism provides empirical corrections for differences, for example, between LEDs due to chemistry, manufacturing variations, and other hard-to-model and hard-to-control variations from luminaire to luminaire and from channel to channel. Alternatively, determination of luminaire-specific drive parameters could be determined at a higher level in the processing hierarchy, e.g., by a script compiler in an application computer.

Figure 5:
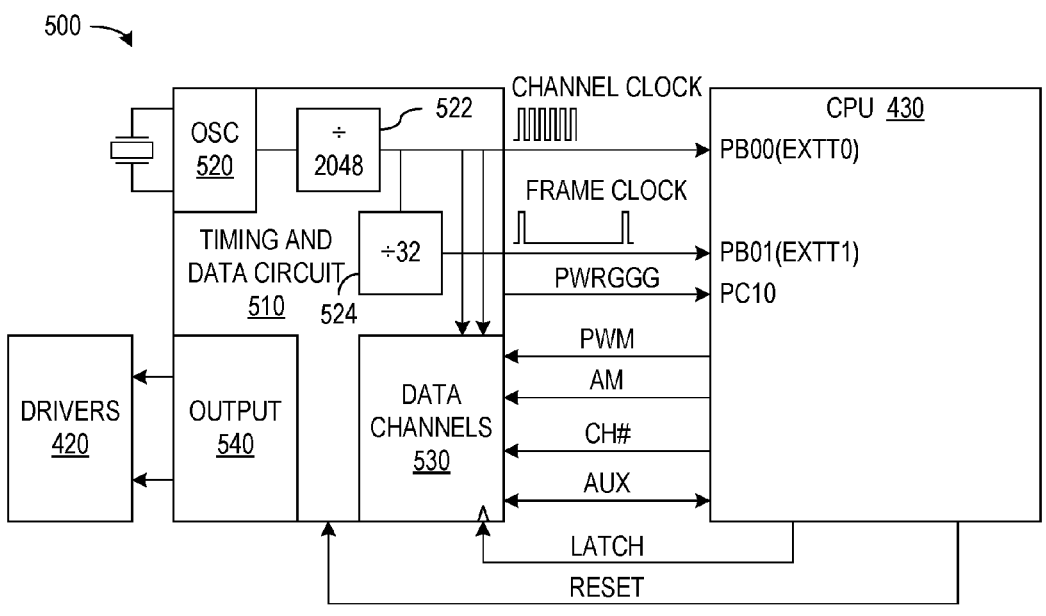
FIG. 5 is a block diagram illustrating components used in timing the updates of the operating parameters of a luminaire in accordance with an embodiment of the invention.

Luminaire 400 as described above produces continuous light that is structured as a series of consecutive frames played back rapidly. In an exemplary embodiment, each frame has the same duration, which is 0.001 sec, so that CPU 430 may need to update the operating parameters of drivers at a rate of 1 kHz. FIG. 5 illustrates in more detail a system 500 for connections of CPU 430 and driver circuits 420 through a timing logic 510 that generates precise timing signals that are used to keep the frame rate constant and synchronized with the operation of CPU 430. Timing logic 510 may be implemented using known circuit technology including but not limited to a circuit board with discrete components, a field programmable gate array (FPGA), a complex programmable logic device (CPLD), or a custom integrated circuit. In this particular embodiment, CPU 430 executes firmware that gathers script data and must be ready to program logic 510 in synchronization with the 1 kHz frame rate. (The 1 kHz frame rate is a reasonable rate that can avoid noticeable flicker in the illumination from luminaire 400 and reproduce fast lighting effects, but other frame rates could be employed.) Logic 510 produces three timing signals, a base clock signal, the frame clock signal, and the channel clock signal, that control the timing of data flow from CPU 430 to drivers 420. The base clock signal operates at 65.536 MHz and forms the basis for the other timing signals. An accurate quartz crystal oscillator circuit 520, which remains stable over time and temperature, can generate the base clock signal.

A divider 522 divides the 65,536-kHz base clock signal by 2048 to generate a 32-kHz channel clock signal. Because in the exemplary embodiment each frame includes up to 32 channels of data, the 32 kHz frequency of the channel clock precisely matches the rate at which new channel data must be "fed" to logic 510 in order to provide new frame data at a rate of 1,000 frames per second. This channel clock signal connects to an interrupt pin PB00 of CPU 430, which in the exemplary embodiment is programmed to interrupt on the falling edge of the channel clock signal. A divider 524 divides the 32-kHz channel clock signal by 32 to create the frame clock signal. The frame clock signal is thus a 1 kHz signal, which corresponds to the frame output rate for the exemplary embodiment of luminaire 400. The frame clock signal is output to another interrupt pin PB01 of CPU 430 that is programmed to interrupt on the rising edge of the frame clock signal.

The frame and channel clock signals work together as follows in the exemplary embodiment of the invention. Every time the frame pulse interrupts CPU 430, CPU 430 resets a channel count (CH#) to 0. Every time the channel pulse arrives, CPU 430 reads current data for the channel identified by the channel count CH# and "feeds" that channel data to logic 510, then CPU 430 increments the channel count CH# in preparation for the next channel interrupt. When the channel count CH# hits 31, the last channel's data for a frame is output, and the channel count CH# can be set to either 32 or 0, which does not matter because the next rising edge of the frame clock signal will happen before the next falling edge of the channel clock signal, ensuring that the channel count is properly returned to zero and avoiding race conditions.

Each channel interrupt also causes CPU 430 to assert a signal LATCH to data channels 530, and data channels 530 latch the channel data from CPU 430 when signal LATCH is asserted, e.g., goes from low to high state. Assertion of signal LATCH tells logic 510 that signals PWM and AM accurately reflect the duty cycle and amplitude for the drive signal corresponding to the channel number represented by signal CH#. Other data or auxiliary information may be transferred between CPU 430 and logic 510 at the same time. Signal LATCH starting unasserted (e.g., low) allows CPU 430 to set up all the data on the bus and make sure the data pins are stable prior to telling logic 510 to accept the data for the next channel. An output circuit 540 of logic 510 maintains control signals that cause drivers 420 to produce analog drive signals with the pulse width modulation and the amplitude modulation indicated by the digital operating parameters PWM and AM from CPU 430.

CPU 430 can reset logic 510 at any time by asserting and then deasserting a signal RESET. Logic 510 may additionally have a latching low-voltage "brownout" detector. If the supply voltage of CPU 430 falls below specification, a bit is set in logic 510, and a signal PWRGGG goes low and stays low, even after power returns to normal. To ensure safe operation, the only way CPU 430 can clear this bit and remove signal PWRGGG is to reset logic 510 using signal RESET for logic 510.

Figure 6:
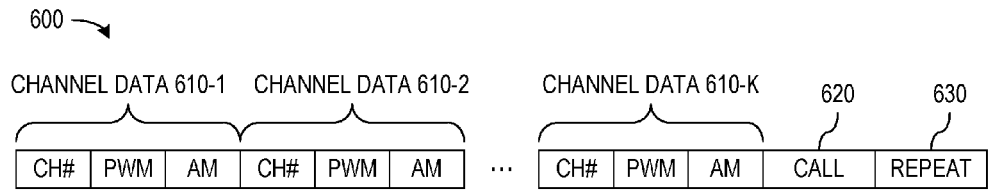
FIG. 6 shows a data structure that a lighting system in accordance with an embodiment of the invention can process to produce lighting for a parameter-defined period of time.

Substantial firmware infrastructure may be needed to maintain and access script files and ensure that the right data arrives at logic 510 at precisely the correct time. Also, lighting that varies over a period of time lasting hours, a day, or even longer, may required a significant amount of frame data when frames are played back at a rate of about 1000 frames per second. Accordingly, methods for reducing the amount of data, e.g., the length of a script required to represent a lighting scenario are desired. FIG. 6 shows a frame descriptor 600, which is a data structure that describes lighting over a programmable period of time. Frame descriptor 600 begins with channel data 610-1 to 610-$q$ that represent a particular spectral power distribution. In the illustrated embodiment, there are K pieces of channel data 610-1 to 610-K, generically referred to herein as channel data 610. The number K may be equal to the number q of light channels in a specific luminaire or may be fixed by a protocol for defining a luminaire-independent description of a spectral distribution. In an exemplary embodiment, K is equal to thirty-two.

Each piece 610 of channel data specifies a channel number CH# identifying a light channel and parameters PWM and AM respectively specifying a pulse width duty cycle and amplitude for a drive signal of the light channel corresponding to the channel number CH#. This data format is convenient for description of a spectral distribution in a luminaire that uses both pulse width modulation and amplitude modulation to control the intensity of light emitted from light channels. However, channel data 610 could use other formats to represent the desired intensity of light from respective light channels. For example, each pair of parameters PWM and AM could be replaced with a single number representing an output intensity for the corresponding light channel.

Channel numbers CH# in channel data 610 can be represented using an integer, and in an exemplary embodiment of the invention, each channel number CH# is a 5-bit value to identify up to 32 separate channels. When frame descriptor 600 is a fixed sized data structure, channel numbers CH# could be eliminated, and the position of parameters PWM and AM in frame descriptor 600 could identify the corresponding light channels. However, use of channel numbers CH# can simplify implementation of a frame data output device by including the channel number to which this block of data belongs. In particular, in the exemplary system of FIG. 5, channel numbers CH# is a parameter passed to timing circuit 510 to reduce the amount of circuitry required in logic 510 and having channel numbers CH# available in frame descriptor 600 simplifies generation of output data.

Parameter PWM controls the duty cycle or the ratio of the "on" time to the period of the drive signal. In the exemplary embodiment, parameter PWM is an integer variable in a range from 0 to ($2^N$–1), where the duty cycle is the ratio of the PWM parameter to a fixed integer $2^N$. The value of exponent N can be anything, but in the exemplary embodiment, N is sixteen, so parameter PWM is a 16-bit value representing a fraction in a range from 0/65,536 to 65,535/65,536 or from 0 to about 99.998% on-time.

Parameter AM controls the amplitude of a drive signal for a light channel when the light channel is "on." Parameter AM can represent a percentage of a maximum drive current or voltage and can similarly be represented as an integer in a range from 0 to $2^K$–1 where the amplitude fraction is the ratio of parameter AM and a fixed integer (e.g., $2^K$–1). The value of K can be anything, but in the exemplary embodiment, K is six so that each AM parameter is a 6-bit value.

Channel data 610-1 to 610-K defines a spectral distribution. For example, to define/create a spectral distribution corresponding to black body radiation at a 2700° K, parameters PWM and AM for each light channel are selected to produce an output intensity from that light channel that approximates the relative power from a 2700° K black body that falls in a spectral band corresponding to the light channel. A playback operation using channel data 610 in luminaire 400 of FIG. 4 can employ CPU 430 (if necessary) to convert channel data 610-1 to 610-K to parameters appropriate for the available light channels 410-1 to 410-$q$ then send the converted channel data to logic 510, which operates light channels 410-1 to 410-$q$ to produce respective intensities that collectively approximate radiation from a black body at 2700° K. For example, if channel data 610-1 to 610-K does not correspond one-to-one with light channels 410-1 to 410-$q$, channel mapper 486 and light driver module 487 can convert parameters PWM and AM from channel data 610 into parameters appropriate for light channels 410-1 to 410-$q$ before drivers 420 are programmed. If all or a subset channel data 610-1 to 610-K corresponds one-to-one with light channels 410-1 to 410-$q$, parameters PWM and AM may be used directly for programming of drivers 420 or may be calibrated by light driver module 487 before being used to program drivers 420.

Data structure 600 further includes a repeat parameter 630 and a call parameter 620 that allows data structure 600 to define multiple frames of illumination. In particular, repeat parameter 630 indicates the number of frames represented by frame descriptor 600. For example, if repeat parameter 630 is 1, then frame descriptor 600 describes a single frame and that frame is played back once. If repeat parameter 630 is a 32-bit value, the maximum number of frames described is 2^32–1=4,294,967,295, which covers a time span of over 8 years with 1 millisecond per frame period. Accordingly, any duration from 1 millisecond to 8 years in 1 millisecond intervals is possible with reasonably sized parameters. Additionally, a repeat parameter with the value 0 can be interpreted as encoding of infinity, so that the frames based on the frame descriptor 600 are played back for an indefinite time.

Call parameter 620 identifies a procedure to be called for each frame is played. Call parameter 620 can, for example, be a four byte value for a 32-bit call address where the value "0" indicates that the frame is static and no procedure is called. For example, to create a constant light output for a desired time period of time, repeat parameter 630 is set to the number of frames corresponding to the desired time, and call parameter 620 is set to zero to indicate no procedure is called. The luminaire would then repeatedly play a frame having a constant spectral distribution represented by the channel data 610 of the frame descriptor 600.

Call parameter 620 can be used to play back dynamically changing spectral distributions. In particular, call parameter 620 can identify a software procedure that modifies channel data 610. For example, to dim the illumination from a luminaire, call parameter 620 can identify a procedure that reduces at least one parameter PWM or AM in the channel data 610. Other procedures could analyze the desired spectrum at each frame point and encode the best approximation of the desired spectrum for the next frame.

Figure 7:
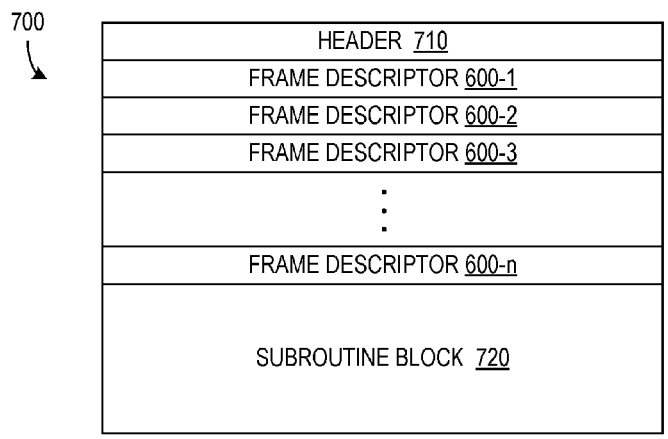
FIG. 7 is a block diagram of a compiled script for a lighting system in accordance with an embodiment of the invention.

FIG. 7 illustrates a format of a compiled script 700 that HLL interpreter 490 of FIG. 4 can interpret to produce lighting from luminaire 400. Compiled script 700 includes a header 710, a set of frame descriptors 600-1 to 600-$n$, and a subroutine block 720. Header 710 can include information identifying and describing script 700. For example, header 710 can include a script name parameter, the number n of frame descriptors, and the size of subroutine block 720. Header 710 can be selected to be one block (e.g., 512 bytes) in size for convenient storage standard storage devices such as an SD cards or hard drives. In one specific embodiment, the information in header 710 is as follows: bytes 0-3: total file size, byte 4-7: end of frame data, 8-11: electronic signature indicating that this is a binary script 0x65021802, 12-511: reserved for future use. The first parameter in header 710 tells the total size of the file is in bytes. The second parameter is the same as the first if there is no subroutine block 720. If there is a subroutine block 720, the second parameter tells us where the first section ends (and therefore where the subroutine block begins one byte later. The signature is a specific pattern of 4 bytes that helps confirm that a file is a binary format script, rather than some other kind of file.

Each of frame descriptors 600-1 to 600-$n$ following header 710 can be of the same format as frame descriptor 600, which is described above with reference to FIG. 6. Subroutine block 720 contains a set of subroutines implemented using instructions for PVM 492 of FIG. 4, and each frame descriptors 600-1 to 600-$n$ can include a call parameter that provides an offset to a subroutine in block 720 either from that frame descriptor 600 or from the starting address of script 700. In the case of a non-zero subroutine address in a frame descriptor 600, the subroutine is "called" at the end of each frame playback. Each subroutine may alter duty cycle parameters PWM or drive amplitudes AM from a frame descriptor. For example, subroutines can support dynamic effects such as fading or morphing between one spectral distribution and another. In principle, any mathematical transformation on the output can be performed between each frame playback, though in practice the amount of computation that may be performed "between" frame playbacks is limited by the available processing power. For example, when PVM 492 is implemented in firmware in luminaire 400 of FIG. 4, the processes that may be implemented to change every frame are limited by the speed of CPU 430 and the efficiency of the virtual machine supporting the math processes. Further, the available processing time between frames may be somewhat less than the frame clock period in order to have the data ready for loading data into the driver circuits for playback and in order to access a script.

Compiled script 700 or a source script containing similar information describing lighting from a luminaire can be a commercial product similar to music or video. In some embodiments, compiled or uncompiled scripts can be stored and sold in a computer-readable media, e.g., a non-transient media, such as an optical or magnetic disk, a memory card, or other solid state storage that a luminaire, an application, or another portion of the lighting system can interpret or process to reproduce a lighting scenario. Such media may further be or be contained in a server or other device connected to a network such as the Internet that provides for the downloading of data and executable instructions.

Figure 8:
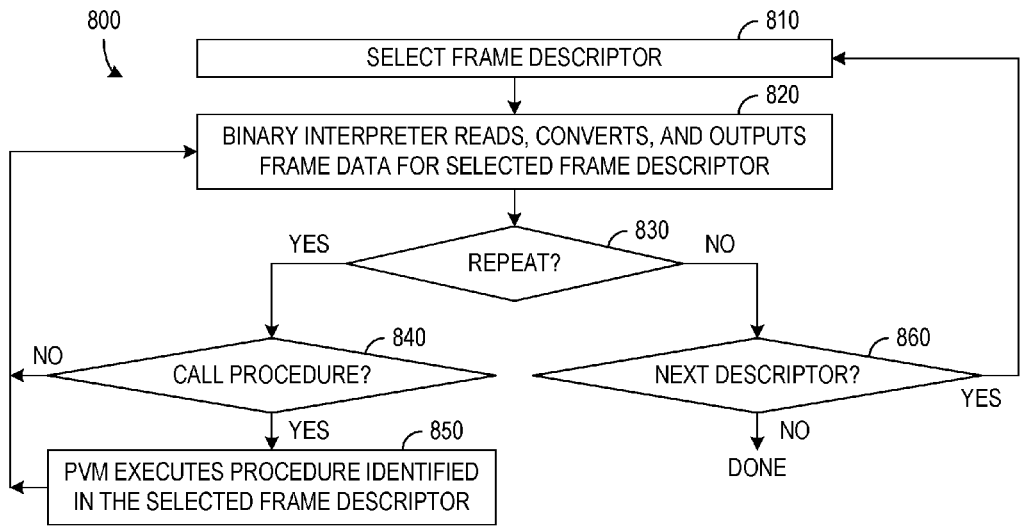
FIG. 8 is a flow diagram of a process for interpreting the script of FIG. 7 and operating a luminaire in accordance with an embodiment of the invention.

A playback process 800 for script 700 is illustrated by the flow diagram of FIG. 8. The playback process 800 begins in step 810 with HLL interpreter 490 selecting a frame descriptor 600, e.g., identifying the first frame descriptor 600-1 in script 700. In an exemplary embodiment, HLL interpreter 490 plays back frame descriptors 600-1 to 600-*n* in a sequential order, and each frame descriptor 600-1 to 600-*n* can either contain frame data that is fixed or frame data that a subroutine call changes. For each frame period, HLL interpreter 490 activates binary interpreter 491 in step 820 to read, convert, and output the next frame data to the driver circuits of the light channels. For example, as described above with reference to FIG. 5, the output of frame data can occur one channel at a time with the timing for data transfers controlled by a channel clock. In step 830, HLL interpreter 490 then determines whether the selected frame descriptor 600 should be repeated. If not, for example, if the last iteration of the selected frame descriptor 600 has been executed, the playback process 800 branches to step 860 and determines whether there is another frame descriptor to play back. If playback of the selected frame descriptor is to be repeated, HLL interpreter 490 in step 840 checks the call parameter of the frame descriptor to determine whether a procedure needs to be performed before the next output of frame data. For a static frame descriptor, no procedure is called, and the same frame data can be output in step 820 according to the frame timing requirements. If the call parameter of the current frame descriptor 600 identifies a subroutine, process 800 branches from step 840 to step 850, and HLL 490 activates PVM 492 to execute the subroutine identified by the call parameter of the current frame descriptor 600. In alternative play back processes, the procedure call (steps 849 and 850) can be before output of frame data in step 820 or between step 820 and checking the repeat count in step 830. Each subroutine must be sufficiently short that PVM 492 can complete the subroutine and potentially change the frame data within a period of the frame clock. If the call parameter of the current frame descriptor 600 does not identify a subroutine, the frame data remains unchanged. Accordingly, the next frame displayed can use the same frame data as did the previous frame or can use new frame data produced by a procedure call. When HLL interpreter determines in step 830 that the repeat count for a frame descriptor 600 is exhausted, the luminaire loads the next frame descriptor 600 from a script 700 and repeats the playback process for as many frames as the new frame descriptor 600 describes.

Use of repeat and call parameters 630 and 620 in frame descriptor 600 as described above can significantly reduce the amount of data and the script length required for a playback process. For example, with two bytes for PWM data, one byte for AM data, one byte to specify the target channel, and 32 channels per frame, each frame requires 128 bytes of data or 136 bytes per frame if eight additional overhead bytes are added per frame. Since frames repeat 1000 times per second, the net data rate is about 1.36 Mb/sec, which is similar to the payload data rate of a compact disc (CD). Accordingly, play back of lighting in an exemplary embodiment takes about the same amount of data per second as does play back of high fidelity stereo audio. This data rate may be different in other embodiments of the invention that use on-the-fly data compression to reduce data throughput or that differ in the number of light channels, the frame playback rate, or the number of bits representing the emitted light intensity from each channel.

PVM 492 in an exemplary embodiment of luminaire 400 of FIG. 4 is a firmware implementation of a stack-oriented, floating-point math capable co-processor. Alternatively, PVM 492 could be implemented as a specialized hardware co-processor. In either case, PVM 492 can, for example, compute transforms from the current frame data to the next frame data in real time, or near-real time, allowing for programmable lighting effects based on arbitrary algorithms.

FIG. 9 illustrates an exemplary architecture of a stack-based co-processor 900 capable of executing compiled scripts. Co-processor 900 specifically runs a machine language that can be used to define procedures embedded within a script. As shown in FIG. 9, co-processor 900 includes a floating point stack 910, channel registers 920, frame registers 930, a memory file 950, and a program stack 960. The architecture of co-processor 900 can be implemented as a virtual machine or in hardware. In particular, PVM 492 of FIG. 4 is an example of a virtual machine implemented in firmware or other program code executed by CPU 430. In the case of a virtual machine implementation, registers 910, 920, 930, 940, 950, and 960 correspond to locations in the memory space of the general purpose CPU, and the general purpose CPU executes program code to interpret the instruction set of co-processor 900 and particularly to manipulate the content of registers 910, 920, 930, 940, 950, and 960 in accordance with those instructions. Alternatively, co-processor 900 can be implemented in hardware including registers 910, 920, 930, 940, 950, and 960 and processing circuits that implement the desired instruction set.

The script language of co-processor 900 can provide major floating point and trigonometric operations, as well as conditional branching, counting, looping, and other standard programming constructs. The instruction set can further be optimized for reaching into frames to read, modify, and write data into running frames in real time, and to support arbitrary calculations which might be useful in controlling frames to implement complex effects. In an exemplary embodiment, co-processor 900 includes two major components. One component is a general-purpose processor optimized for floating point math including operations such as add, subtract, multiply, divide, logarithms, exponents, trigonometry functions, and pseudo-random number generation. Another component is a frame processing unit. The frame processing functions can include providing interfaces between the frame currently in play and the main CPU, supplying information of computational value on the current frame (e.g., a count of the times that the current frame has played back and the number of times the current frame will repeat before advancing to the next frame) to the script programmer.

Co-processor 900 is stack-oriented, and floating point stack 910 consists of registers X, Y, Z, and T on which floating point operations can be performed. Table 1 lists an exemplary set of floating point operations that co-processor 900 can perform on floating point stack 910. In the tables below, the code represents an instruction in a syntax intended for a source script that a user or an application may write, and the hex values indicate the instruction code in the compiled script. The operation and operation description for an instruction indicate the action that co-processor 900 takes in response to the instruction in a compiled script. In Table 1, unitary operations (e.g., SIN, COS, SQRT, LOG) take the value in register X and return a new value back to register X. Binary operators (e.g., ADD, SUB, MUL, DIV, YAX, etc.) take the values in registers X and Y, compute a result, drop the stack, and return the result back to register X. These operations are similar to operations performed by well-known calculators that use Reverse Polish Notation (RPN).

TABLE 1

Math Operations

| Code | Op Description | Hex | Operation |
| --- | --- | --- | --- |
| ADD | Add | C0 | w <= Y + X; DROP; X <= w |
| SUB | Subtract | C1 | w <= Y − X; DROP; X <= w |
| MUL | Multiply | C2 | w <= Y * X; DROP; X <= w |
| DIV | Divide | C3 | w <= Y / X; DROP; X <= w |
| POW | Y to X power | C4 | w <= Y^X; DROP; X <= w |
| CHS | Change sign | D0 | X <= −(X) |
| INT | integer part | D1 | X <= integer(X) |
| FRAC | fractional part | D2 | X <= fraction(X) |
| RECIP | Reciprocal | D3 | X <= 1/X |
| SQRT | Square root | D4 | X <= SQRT(X) |
| SIN | Sine | D5 | X <= SIN(X) (X in radians) |
| COS | Cosine | D6 | X <= COS(X) (X in radians) |
| TAN | Tangent | D7 | X <= TAN(X) (X in radians) |
| ASIN | Arcsine | D8 | X <= SIN−1(X) |
| ACOS | Arccosine | D9 | X <= COS−1(X) |
| ATAN | Arctangent | DA | X <= TAN−1(X) |
| LOG | Logarithm base 10 | DB | X <= LOG10(X) |
| EXP | Antilog base 10 | DC | X <= 10^X |
| RND | Random | DD | X <= RANDOM(X) |
| RTD | Radians to degrees | DE | X <= 360 * (X/2 * PI) |
| DTR | Degrees to radians | DF | X <= 2 * PI * (X)/360 |

Table 2 shows a set of stack operations that can be implemented in co-processor 900 to perform some useful manipulations of floating point stack 910 without performing a floating point mathematical operation.

TABLE 2

Stack Operations

| Code | Op Description | Hex | Operation |
| --- | --- | --- | --- |
| DUP | Lift stack; retain X | F0 | T <= Z; Z <= Y; Y <= X; X unchanged |
| DROP | Drop stack (Roll down) | F1 | w <= X; X <= Y; Y <= Z; Z <= T; T <= w |
| SWAP | Swap X and Y | F2 | w <= X; X <= Y; Y <= w |
| INDX | Indirect by X | F3 | X <= MEM(ABS(INT(X))) |
| INDY | Indirect by Y | F4 | X <= MEM(ABS(INT(Y))) |

In addition to floating point stack registers 910, co-processor 900 includes 100 floating point storage locations numbered MEM 00 to MEM 99 in memory file 930. A luminaire can use memory file 950 to store values until the luminaire is switched off or the values are deliberately over-written. Table 3 shows operations that can be implemented in co-processor 900 to move data between floating point stack 910 and memory file 950 or control registers 940 or to push a constant floating point number (FP#) onto floating point stack 910.

TABLE 3

Storage Operations

| Code | Op Description | Hex | Operation |
| --- | --- | --- | --- |
| STO nn | Store X to memory | 10 nn | MEM[nn] <= X; (0 <= nn <= 99) |
| STO R | Store X to R register | 10 80 | R <= X |
| STO I | Store X to I register | 10 81 | I <= X |
| STO C | Store X to C register | 10 82 | C <= X |
| STOIND nn | Store X indirectly | 12 nn | MEM[MEM[nn]] <= X (0 <= nn <= 99) |
| RCL nn | Get X from memory | 18 nn | DUP; X <= MEM[nn] (0 <= nn <= 99) |
| RCL R | Get X from R register | 18 80 | DUP; X <= R |
| RCL I | Get X from I register | 18 81 | DUP; X <= I |
| RCL C | Get X from C register | 18 82 | DUP; X <= C |
| RCLIND nn | Get X indirectly | 1A nn | DUP; X <= MEM[MEM[X]] |
| PUSH FP# | Get X from FP# | 60 FP# | DUP; X <= double (f7f6f5f4f3f2f1f0) |

Control registers 940 include a Program Control (PC) register that points to the next instruction to be executed by co-processor 900, an instruction register (IR) that holds the instruction being executed, and an stack pointer (SP) register that points to a current return address in program stack 960. The IR register in the exemplary embodiment can store the entire instructions (including parameters) for enhanced debugging ability and for convenience of implementation. Tables 4 and 5 respectively illustrate unconditional and conditional branch operations in an exemplary instruction set for co-processor 900. The unconditional branch operations change register PC and accordingly the next instruction loaded into register IR. The conditional branch operations evaluate a condition and change register PC and the next instruction loaded into register IR if the condition is satisfied. A CALL operation adds a return address to program stack 460 and updates register SP to point to the added return address before branching to the called label. As a result, program stack 460 holds return addresses for CALL operations to enable corresponding returns, and register SP points to a return address in program stack 460 to enable a return from the last CALL operation.

TABLE 4

Unconditional Branch Operations

| Code | Op Description | Hex | Operation |
| --- | --- | --- | --- |
| CALL label | Call subroutines | 20 | BB AA |
| JMP label | Jump to address | 22 | BB AA |

TABLE 5

Conditional Branch Operations

| Code | Hex | Operation |
| --- | --- | --- |
| JXZ label | 40 | BB AA if (X == 0) jump to AABB |
| JXNZ label | 41 | BB AA if (X != 0) jump to AABB |
| JXPL label | 42 | BB AA if (X >= 0) jump to AABB |
| JXMI label | 43 | BB AA if (X < 0) jump to AABB |
| JXEY label | 44 | BB AA if (X == Y) jump to AABB |
| JXNEY label | 45 | BB AA if (X != Y) jump to AABB |
| JXGTY label | 46 | BB AA if (X > Y) jump to AABB |
| JXLTY label | 47 | BB AA if (X < Y) jump to AABB |
| JRZ label | 50 | BB AA if (R == 0) jump to AABB |
| JRNZ label | 51 | BB AA if (R != 0) jump to AABB |
| JIZ label | 54 | BB AA if (I == 0) jump to AABB |
| JINZ label | 55 | BB AA if (I != 0) jump to AABB |
| JCZ label | 58 | BB AA if (C == 0) jump to AABB |
| JCNZ label | 59 | BB AA if (C != 0) jump to AABB |
| ICJNZ label | 5A | BB AA C <= C + 1; if (C != 0) jump to AABB |

TABLE 5-continued

Conditional Branch Operations

| Code | Hex | Operation |
|---|---|---|
| SCZDAJ label | 5B | BB AA if (C != 0) {C <= C − 1; jump to AABB} |

Frame registers 930, which in the illustrated embodiment are registers R, I, and C, are primarily for the frame processing component of co-processor 900. Register R is nominally used for the repeat count of the current frame descriptor. In particular, upon subroutine entry in the compiled lumen script of FIG. 7, HLL interpreter 490 stores the "repeat count" parameter 630 for the calling frame descriptor 600 in the register R. For example, if the frame descriptor currently being displayed has a repeat parameter with value 1000 times, then the high level interpreter will store the value 1000 in register R every time the subroutine for that frame descriptor is called. The subroutine may overwrite register R and use register R for other purposes so long as the repeat parameter isn't needed, but the next time the subroutine is called for the frame descriptor, register R is overwritten again.

The HLL interpreter when calling a subroutine from a frame descriptor stores an iteration count in register I. For example, if a frame descriptor has a repeat parameter with value 1000 (R=1000) then the value in register I will range from 0 (when the subroutine is first called) to 999 (when the subroutine is last called before the HLL interpreter advances to the next frame descriptor). Register I can be used upon initial entry of the subroutine, e.g., when I=0, as a flag for conducting one-time initialization tasks for the subroutines. If I is not 0, then the one-time initialization is skipped. An instruction, JINZ, enables this. Register I also serves as a progress indicator. If register R is not 0, then the value in register I will range from 0 to R−1, and the display of a frame descriptor will be about ((I+1)/R)*100% complete when a subroutine is being executed. If R is zero to designate unlimited repetitions, then a percentage completion has no meaning, but register I will indicate the number of times the subroutine has been called so far for the current frame descriptor.

Register C is nominally for channel numbers and in the exemplary embodiment of the invention holds values of 0 to 31 only and "wraps around" back to 0 if incremented past 31. Operations to store or recall channel data (e.g., PWM and AM data from the current frame) will operate on the channel specified by the "C" register. Some further operations, which are illustrated in Table 6, can be included in an exemplary instruction set for co-processor 900 to increment or decrement channel register C.

TABLE 6

Channel Operations

| Code | Hex | Operation |
|---|---|---|
| INC C | 70 | C <= C + 1; use ICJNZ for loop instead |
| DEC C | 72 | C <= C − 1; use DCZDAJ for loop instead |

Each routine (e.g., in subroutine block 720 of a compiled script 700) ends with either a return (RET) instruction or a halt (HALT) instruction. A RET operation uses the return address temporarily stored on the top (to which register SP points) of program stack 460 to "find" the correct return address for a pending CALL operation and then updates register SP to point to the next return address in program stack 469. A RET operation returns to the high-level script when there are no further pending subroutine returns. The HALT operation forces an immediate return to abort the low-level program in progress and return to the high-level script operation. Note that each unimplemented instruction value can be treated as a HALT operation in case co-processor 900 starts to execute random memory content as program code.

TABLE 7

Return Operations

| Code | Op Description | Hex |
|---|---|---|
| RET | Return from subroutine | 24 |
| HALT | Quit immediately | 73 |

A script compiler, e.g., script compiler 322 of FIG. 3, may be used to generate compiled script 700 from a source file. The source script file may have a simple format such as a comma separated variable file or .CSV. Such files can be created using commonly available applications such as Microsoft Excel, Open Office, or a simple program like Notepad. A simple source script file can define a series of frame descriptors, wherein each frame descriptor includes channel data defining the color or spectral distribution of lighting and repeat count defining the playback timing. A more advanced source script file may identify or contain prefabricated or custom modules or subroutines, which may be re-used in different locations and contexts in a script and re-used in different scripts. The syntax for the source script file can be defined to permit a unique definition of compiled script 700. Table 8 shows an example of a source script that defines channel data and includes a subroutine using the instruction set described above. Comments in Table 8 are on lines beginning with the symbol "#."

TABLE 8

Script Source Code

\# This starts a frame descriptor and defines the initial channel data (the initial frame).
\# An application with a GUI for selection of a spectral distribution may generate this data.
1,18724,16, 2,17873,13, 3,11915,22, 4,20426,14
5,18724,35, 6,23831,47, 7,22980,52, 8,16171,52
9,11915,52, 10,5958,52, 11,11064,52, 12,65535,52
13,65535,52, 14,65535,52, 15,65535,52, 16,65535,52
17,55322,52, 18,65535,52, 19,65535,52, 20,65535,52
21,65535,52, 22,65535,52, 23,49364,52, 24,53620,52
25,24000,52, 26,24000,52, 27,24000,52, 28,24000,52
29,24000,52, 30,0,0, 31,0,0, 32,0,0
\# The "CALL" instruction is right before the repeat count, IF there is a TABLE 8-continued Script Source Code

```
# subroutine to call. Otherwise, it can be omitted.
# The compiled script will includes an address or offset for the FADEUP routine
CALL,FADEUP,
# The repeat count corresponds to 1500 frames or 1.5 seconds in this example
REPEAT,1500,
# "END" indicates no more frame descriptors in this script
END,,
# This example illustrates defining a LABEL and
# that the same location can have more than one label.
LABEL,FADEUP,
LABEL,RATIO,
# The following routine will increase the brightness in a square-law manner,
# from the starting point as specified by the first and only frame in the script.
,PUSH,1
,RCL,I
,ADD,
,RCL,R
,DIV,
,DUP,
,MUL,
,PUSH,1.1
,MUL,
,PWMALL,
# Every subroutine must end with a ,RET,
,RET,
```

The above description of co-processor 900, the specific instruction set for co-processor 900, and a source script is only an illustrative example one possible embodiment. In particular, some of the above instructions may not be implemented or used in alternative embodiments of co-processor 900. Further, the instructions set has substantial room for expansion and inclusion of customized operations like "read power consumption in watts" or "read temperature," which may be useful at the low level of a script.

A desired lighting scenario including time variation of the spectral distribution of lighting can be scripted, compiled, and played as described above. In general, descriptions of desired lighting scenarios can be independent of the luminaire on which they may be played, but at some point in the scripting, compiling, or playback processes the luminaire-independent descriptions are converted to operating parameters that are appropriate for the luminaire actually performing the playback. In accordance with an aspect of the current invention, the transition from luminaire-independent and luminaire-dependent descriptions of lighting can occur at different processing points. FIG. 10 is a flow diagram of a process 1000 for producing a desired lighting scenario and illustrates some of the different ways to transition from luminaire-independent and luminaire-dependent descriptions.

Process 1000 starts in step 1010 with determining a desired sequence of spectral distributions (SPDs), e.g., (SPD (t=0), SPD(t=1), SPD(t=2), . . . , SPD(t=M−1)) to be played over time. For example, a spectrometer or other light measuring device can take a series of periodic measurements of the spectral power distribution in a lighting environment being recorded, or an author may compose a series of colors for lighting over a range of time. The result of step 1010 is a sequence of spectral distributions (SPDs), e.g., (SPD(t=0), SPD(t=1), SPD(t=2), . . . , SPD(t=M−1)). Each SPD may provide intensity data for a range of light wavelengths, for example, from about 350 to 750 nanometers. In step 1020, each spectral distribution SPD is characterized by a set of channel data. For example, each SPD may be represented by K intensity values, where each intensity value corresponds to a particular wavelength band or light channel. (However, for efficiency, a single set of intensity values can be used to represent a set or range of different time intervals.) In general, the number K may be the same or different from the number light channels available in a luminaire, and in the exemplary embodiment, K is 32 even though a typical luminaire may have fewer physical light channels. For example, a computer program can perform step 1020 by converting each SPD into channel data (e.g., channel data 610-1 to 610-K of FIG. 6) including K pairs of parameters PWM and AM. Parameters PWM and AM can be luminaire-independent drive parameters that would be appropriate for a hypothetical average luminaire having K light channels. Alternatively, the calculation of parameters PWM and AM may depend on the operating parameters of the playback luminaire.

In general, there may not be one "best" solution for conversion of a SPD into channel data or specific parameters PWM and AM because spectra of light channels in a luminaire generally overlap and because more than one combination of parameters PWM and AM can be used to represent the same intensity. As a result, a process that converts a spectral power distribution at time t to a (PWM, AM) pair for each of 32 light channels may be non-trivial and may be a possible "choke-point" in producing a desired lighting scenario. For example, when more than one (PWM, AM) combination creates essentially identical output spectra, it is likely that one of the solutions will be superior in terms of power consumption or temperature. In the case where a certain amount of error can be tolerated, one slightly less accurate solution might be dramatically more power efficient, in which case a small amount of accuracy can be sacrificed for increased power efficiency, or a degree of power efficiency can be sacrificed for higher accuracy. An exemplary implementation may permit a user to create solutions weighted differently for different goals.

Step 1030 is the process of producing a script in the form of a source file using a syntax that may be relatively easy for a user to read or modify. In particular, the M SPDs determined in step 1010 may be represented using M sections of script text representing M frame descriptors. The channel data for each frame descriptor may be parameters PWM and AM that are lumen-independent or lumen-dependent, depending on whether the transformation of the SPDs is to a lumen-independent or lumen-dependent representation. The repeat count for each frame descriptor would generally correspond to the time between the SPDs. The script could further include a subroutine written using the instruction set described above. For example, a subroutine could over a series of iterations corresponding to the repeat count morph the channel data from one frame descriptor to the channel data of the next frame descriptor, and the representations of the frame descriptors can include calls to that subroutine.

Step 1040 compiles the source script generated in step 1030 to produce a compiled script, e.g., having the format described above with reference to FIG. 7. The compiling process can either use the channel data represented in the source script of step 1030 or convert the channel data from the source script to channel data that is appropriate for the specific luminaire that is to playback the script. An advantage of converting from luminaire-independent channel data to luminaire-dependent channel data during compiling step 1040 is that the source scripts can be luminaire-independent and may be a commodity that is marketable to owners of a variety of types of luminaires. Alternatively, the compiled scripts can be luminaire-independent and be marketable to owners of a variety of types of luminaires.

Step 1050 interprets the compiled script to produce lighting from the luminaire. The interpretation process will generally need to convert the channel data to appropriate operating parameters of the luminaire, particularly if the compiled script is luminaire-independent. However, it may be beneficial for the compiler of the script to perform at least part of the conversion to luminaire-dependent data since the luminaire may have limited processing power.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A lighting system comprising:
    a sensor; and
    a processor executing an interpreter module that accesses the sensor and processes a script to generate operating parameters for a plurality of light channels that operate to produce different spectral distributions of light, the interpreter module processing the script based on reading data from the sensor to cause the light channels to collectively produce a lighting scenario represented by the script, the script comprising one or more elements, each of the elements being selected from a group consisting of:
    a frame of illumination data representing a spectral distribution; and
    a subroutine including program instructions that are executable by the interpreter module.

2. The system of claim 1, wherein the processor that executes the interpreter module provides the operating parameters to the drive circuit to thereby control time variation of the relative intensities of the light output from the light channels.

3. The system of claim 1, wherein the sensor is selected from a group consisting of an infrared (IR) sensor, a temperature sensor, a voltage sensor, a current sensor, a light intensity sensor, a color sensor, a spectral power distribution sensor, a spectrometer, a timer, and a sound sensor.

4. The system of claim 1, wherein the sensor evaluates power consumption in the lighting system and provides input data that the interpreter module uses to optimize energy efficiency of the lighting system.

5. The system of claim 1, wherein a process defined by the script accesses the sensor to monitor performance of the lighting system and determine whether a desired lighting scenario has been achieved.

6. The system of claim 1, wherein the sensor comprises a sound sensor that senses sound cues.

7. The system of claim 6, wherein the script accesses the sound sensor to implement a voice or sound command.

8. The system of claim 6, wherein processing the script includes accessing the sound sensor to synchronize the lighting scenario with the sound cues.

9. The system of claim 1, wherein processing the script includes accessing the sensor to receive remote-control commands from a remote unit.

10. The system of claim 1, wherein the lighting system further comprises communication interface that allows a remote system to read the sensor.

11. The system of claim 1, wherein the lighting system is a luminaire.

12. The system of claim 1, wherein the processor further executes a remote control decoder to interpret signals received through the sensor and thereby extract commands for lighting system.

13. The system of claim 1, further comprising:
    the plurality of light channels that operate to produce different spectral distributions of light; and
    a drive circuit coupled to the light channels and programmable to control relative intensities of light output from the light channels.

* * * * *